(12) United States Patent
Omasta et al.

(10) Patent No.: US 11,767,023 B2
(45) Date of Patent: Sep. 26, 2023

(54) DISPLAYING NEXT ACTION OF AN AUTONOMOUS VEHICLE

(71) Applicant: Volvo Car Corporation, Gothenburg (SE)

(72) Inventors: Tomas Omasta, Povazska Bystrica (SK); Mikael Gordh, Yterby (SE); Hanna Gerdeskans, Gothenburg (SE); Andrea Slaattelia Larsson, Gothenburg (SE)

(73) Assignee: VOLVO CAR CORPORATION, Gothenburg (SE)

( * ) Notice: Subject to any disclaimer, the term of this patent is extended or adjusted under 35 U.S.C. 154(b) by 502 days.

(21) Appl. No.: 16/673,504

(22) Filed: Nov. 4, 2019

(65) Prior Publication Data

US 2021/0129859 A1 May 6, 2021

(51) Int. Cl.
*B60W 50/00* (2006.01)
*B60W 50/14* (2020.01)
*G05D 1/00* (2006.01)
*G06T 19/00* (2011.01)

(52) U.S. Cl.
CPC ........... *B60W 50/14* (2013.01); *G05D 1/0055* (2013.01); *G06T 19/006* (2013.01); *B60W 2050/143* (2013.01); *B60W 2050/146* (2013.01)

(58) Field of Classification Search
CPC ........... B60W 50/40; B60W 2050/143; B60W 2050/146; B60R 16/037; G05D 1/0055; G06T 19/006; G06Q 10/04; G08G 1/096855; G01C 21/36
See application file for complete search history.

(56) References Cited

U.S. PATENT DOCUMENTS

| 8,706,342 | B1 | 4/2014 | Szybalski et al. |
| 8,924,150 | B2 | 12/2014 | Tsimhoni et al. |
| 9,514,651 | B2* | 12/2016 | Linder ................ G08G 1/0967 |
| 9,889,861 | B2 | 2/2018 | Doshi |
| 10,053,001 | B1 | 8/2018 | Nabbe et al. |
| 10,065,505 | B1* | 9/2018 | Briggs ..................... G06T 15/10 |
| 10,843,708 | B1* | 11/2020 | Szybalski ............... G06T 11/20 |
| 11,099,026 | B2* | 8/2021 | Lee ........................ G06T 19/006 |
| 2017/0151958 | A1* | 6/2017 | Sakuma ............ G01C 21/3658 |
| 2017/0253254 | A1 | 9/2017 | Sweeney et al. |
| 2018/0189717 | A1* | 7/2018 | Cao ...................... G06Q 10/083 |

(Continued)

OTHER PUBLICATIONS

Extended European search report received for European application No. 20205801.2 dated Mar. 24, 2021, 11 pages.

(Continued)

*Primary Examiner* — Ian Jen
(74) *Attorney, Agent, or Firm* — Amin, Turocy & Watson, LLP

(57) ABSTRACT

Systems, methods and computer program products that facilitate displaying next action of an autonomous vehicle. A system can include a memory and a processor that executes computer executable components. The computer executable components can include: an analysis component that determines or infers next action of an autonomous vehicle and a display component that generates a graphical user interface that visually conveys the next action, wherein the graphical user interface comprises a shape that dynamically morphs to visually represent the next action.

24 Claims, 14 Drawing Sheets

(56) References Cited

U.S. PATENT DOCUMENTS

2019/0061655 A1   2/2019  Son
2019/0310627 A1*  10/2019  Halder .................. B60W 50/14

OTHER PUBLICATIONS

European Office Action received for European application No. 20205801.2 dated May 11, 2021, 1 page.
Communication pursuant to Article 94(3) EPC received for European application No. 20205801.2 dated Mar. 30, 2022, 11 pages.

* cited by examiner

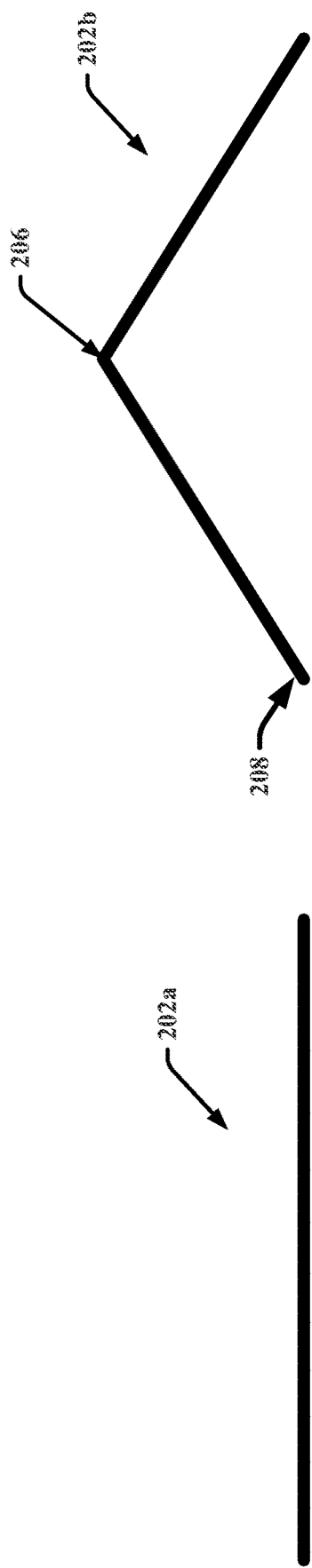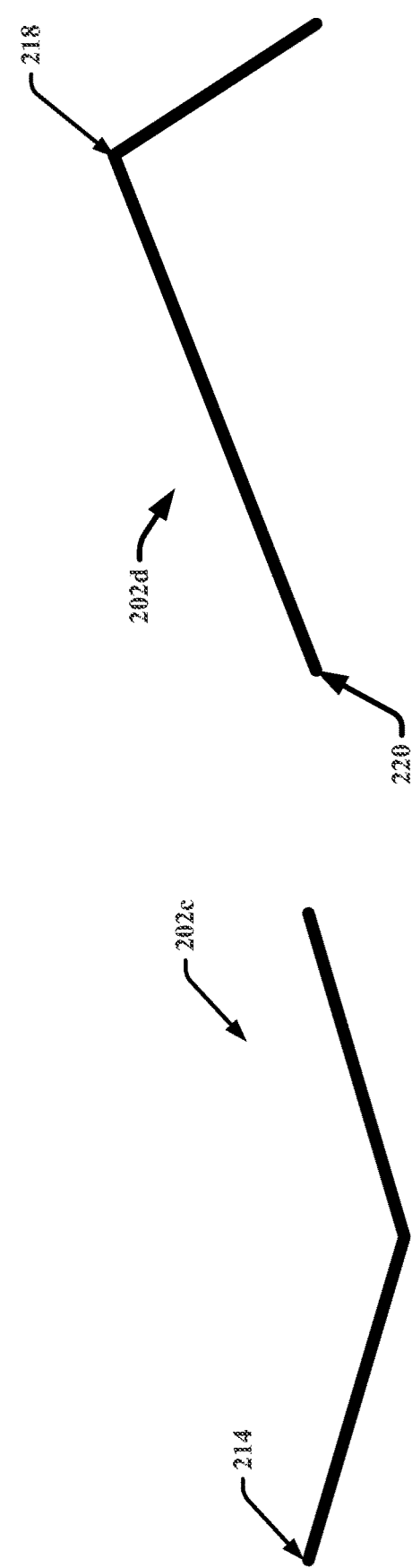
FIG. 2A  FIG. 2B  FIG. 2C  FIG. 2D

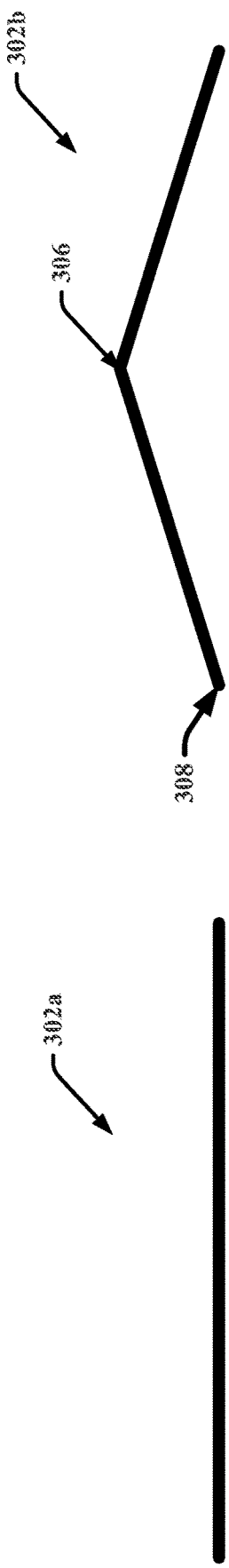
FIG. 3A
FIG. 3B
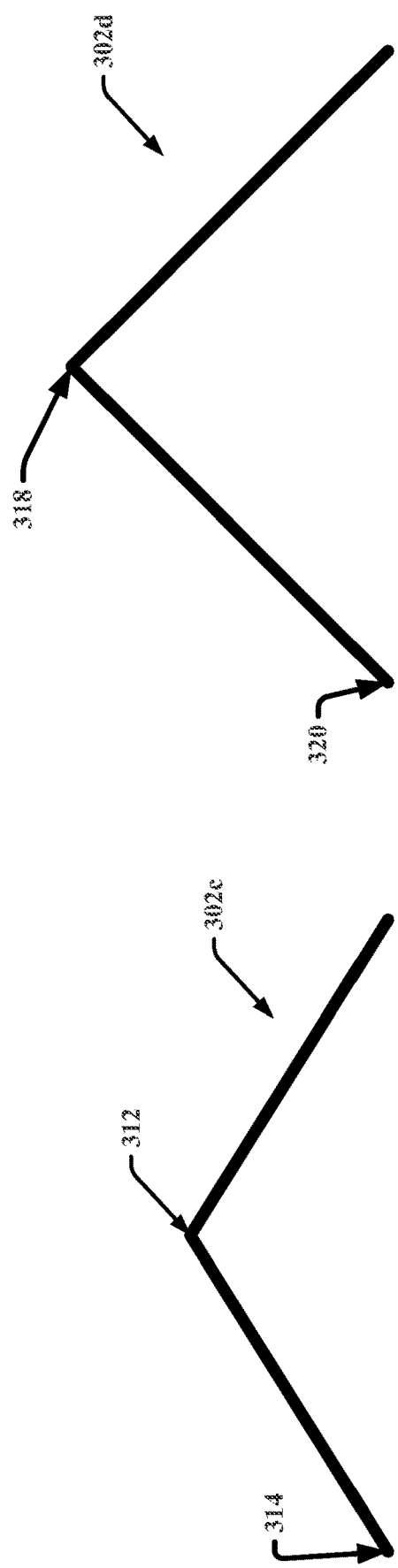
FIG. 3C
FIG. 3D

DISPLAYING NEXT ACTION OF AN AUTONOMOUS VEHICLE

TECHNICAL FIELD

Embodiments disclosed and claimed herein relate to techniques that facilitate displaying next action of an autonomous vehicle.

BACKGROUND

Passengers in an autonomous vehicle can experience motion sickness, anxiety or other discomforts associated with not knowing next navigation or driving acts made by an autonomous vehicle. By displaying next action of an autonomous vehicle (AV) in an easy to understand graphical image, the passengers can quickly be informed of the next actions or movements being made by the autonomous vehicle. This can avoid surprises, reduce anxiety and reduce need for passengers to observe the autonomous vehicle's surroundings in order to understand the AV's movements or next action. Conventional systems generally utilize static images or a combination of multiple images to convey the next action of an autonomous vehicle. The static nature of such systems often results in minimal relief to passengers.

SUMMARY

The following presents a summary to provide a basic understanding of one or more embodiments of the invention. This summary is not intended to identify key or critical elements or delineate any scope of the different embodiments or any scope of the claims. Its sole purpose is to present concepts in a simplified form as a prelude to the more detailed description that is presented later. In one or more embodiments described herein, systems, computer-implemented methods, apparatus and/or computer program products are presented that facilitate driver assist interface in a vehicle.

Graphical user interfaces used by conventional systems to inform passengers of next actions or movements being made by an autonomous vehicle can be improved by employing a shape that dynamically morphs to visually represent the next action of the AV as opposed to the static images used by conventional systems. A shape that dynamically morphs to visually represent the next action can convey information about next action more effectively with just a glance by a passenger of the autonomous vehicle. It also conveys more information such as relative changes in degree associated with factors such as speed, acceleration, direction and turn radius and concurrent changes such as changes in direction and speed.

In accordance with an embodiment, a system comprises: a memory and a processor that executes computer executable components. The computer executable components can include an analysis component that determines or infers next action of an autonomous vehicle, and a display component that generates a graphical user interface that visually conveys the next action, wherein the graphical user interface comprises a shape that dynamically morphs to visually represent the next action.

In some embodiments, elements described in connection with the disclosed systems can be embodied in different forms such as a computer-implemented method, a computer program product, or another form.

DESCRIPTION OF THE DRAWINGS

FIGS. 2A-2D respectively illustrate an example of a non-limiting system that facilitates displaying next action of an autonomous vehicle in accordance with one or more embodiments described herein.

FIGS. 3A-3D respectively illustrate another example of a non-limiting system that facilitates displaying next action of an autonomous vehicle in accordance with one or more embodiments described herein.

DETAILED DESCRIPTION

The following detailed description is merely illustrative and is not intended to limit embodiments and/or application or uses of embodiments. Furthermore, there is no intention to be bound by any expressed or implied information presented in the preceding Summary section or in the Detailed Description section.

Embodiments described herein include systems, methods, and computer program products that facilitate displaying next action of an autonomous vehicle. Instead of relying upon static images or multiple images to convey next action of an autonomous vehicle to passengers of the AV, a graphical user interface (GUI) uses a shape that dynamically morphs to visually represent the next action of the vehicle. A geometric figure that dynamically morphs to visually represent the next action can convey information about next action more effectively in a glanceable manner to a passenger of the autonomous vehicle. It also conveys more information such as relative changes in degree associated with factors such as speed, acceleration, direction and turn radius and concurrent changes such as changes in direction and speed.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Figure 1:
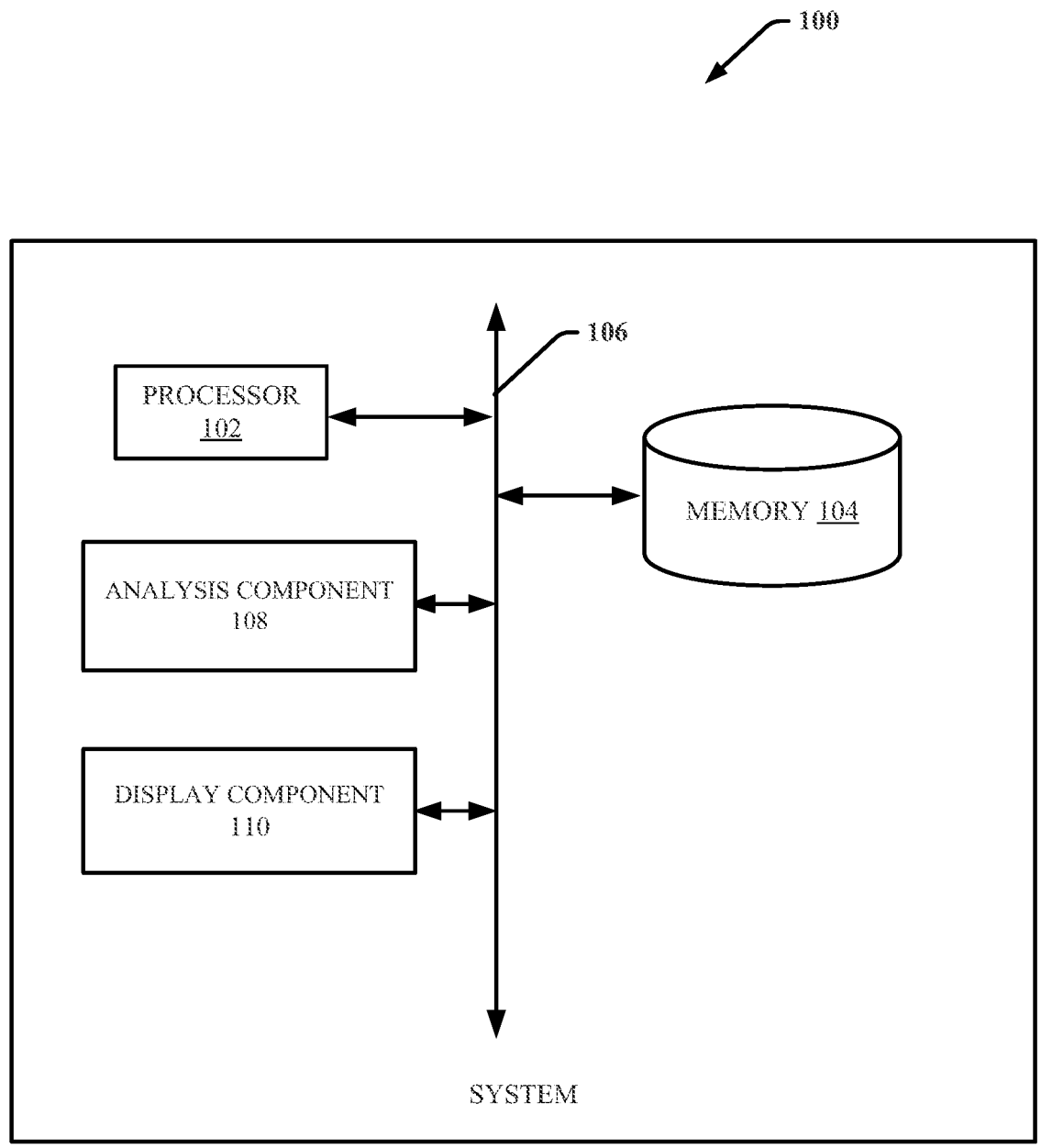
FIG. 1 illustrates a block diagram of an example, non-limiting system that facilitates displaying next action of an autonomous vehicle in accordance with one or more embodiments described herein.

FIG. 1 illustrates a block diagram of an example, non-limiting system 100 that facilitates displaying next action of an autonomous vehicle in accordance with one or more embodiments described herein. The system 100 includes a processor 102 that executes computer executable components stored in at least one memory 104. The system 100 can further include a system bus 106 that can couple various components, including, but not limited to, an analysis component 108 and a display component 110. The analysis component 108 determines or infers next action of an autonomous vehicle. The display component 110 generates a graphical user interface that visually conveys the next action, wherein the generated visualization comprises a shape that dynamically morphs to visually represent the next action of the AV. Since next actions (e.g., a hard turn, braking, acceleration, passing another vehicle . . . ) are not binary or static but rather a fluid set of acts across a continuum from a first state to an end state the generated visualization likewise dynamically morphs the shape in real-time to coincide with the next action across the continuum of sub-acts.

In certain embodiments, the analysis component 108 can determine or infer next action of the autonomous vehicle. For example, the next action can include, for example: a turn, braking, lane change or change in direction, speed, acceleration, deceleration or degree of a turn and the like. The analysis component 108 can utilize data received from systems and devices within the autonomous vehicle as well as extrinsic information (e.g., weather, global positioning system (GPS) data . . . ) to determine or infer the next action. In one example, the analysis component 108 can utilize a route selected by a navigation system of the autonomous vehicle. The selected route can serve as a baseline of actions to be taken by the autonomous vehicle, and the analysis component 108 can utilize the GPS of the autonomous vehicle to determine location of the AV along a selected route. The analysis component 108 can also utilize adjustments made to the route by the navigation system. The analysis component 108 can utilize data received from other systems and devices of the autonomous vehicle in determining or inferring next action as the autonomous vehicle proceeds on the selected route. For example, the analysis component 108 can utilize data received from machine vision systems and devices in order to detect traffic signals. Also, the analysis component 108 can utilize data received from machine vision systems and devices in order to detect presence of pedestrians, cyclists, obstructions or other vehicles that can affect the next action of the autonomous vehicle. In one example, the presence of one or more vehicles or cyclists in front of the autonomous vehicle may cause the autonomous vehicle to decelerate as it proceeds on a straight road. In another example, an autonomous vehicle stopped at a red light can wait to begin a right turn that will be the autonomous vehicle's next action until a pedestrian finishes crossing the street in front of the autonomous vehicle. Information from other vehicle and devices, e.g., for crash avoidance, traffic, speed traps . . . can be utilized in connection with determining or inferring next action to be taken by the AV and generating a dynamic visualization to convey the upcoming action.

In another example, the analysis component 108 can utilize traffic information received wirelessly by the autonomous vehicle. For example, information associated with an accident on a selected route can be utilized by the analysis component 108 to determine that that autonomous vehicle will be slowing down or that another route can be selected by the navigation system.

In another example, the analysis component 108 can utilize information received wirelessly by the autonomous vehicle from other vehicles associated with location, movement and anticipated movement of each such other vehicle. For example, if a vehicle traveling in front of the autonomous vehicle in the same direction transmits information to the autonomous vehicle that the vehicle will be slowing down to make a right turn at the next intersection, the analysis component 108 can utilize such information to determine or infer that the next action of the autonomous vehicle will be to slow down or to change lanes as the vehicle in front of it slows down to make the turn depending on other factors such as proximity of other vehicles.

In another example, the analysis component 108 can utilize data received from devices such as sensors that identify road surface or road conditions such as a pothole or other road hazard that can possibly cause damage to the autonomous vehicle or affect safety or comfort of passengers of the autonomous vehicle. In this example, the autonomous vehicle can slow down or swerve to avoid the pothole or other road hazard depending on other factors such as the proximity of other vehicles. In another example, the analysis component 108 can determine that the vehicle will reduce speed on a gravel road. These determined or inferred actions can be visually represented by the dynamic morphing shape.

In another example, the analysis component 108 can utilize data associated with weather. In one example, the analysis component 108 can utilize data received from devices in the autonomous vehicle such as sensors (e.g., thermometer, barometer, tire pressure, moisture, oil, debris or ice detectors, vehicle operation sensors . . . ) that identify real-time weather conditions. In addition, the analysis component 108 can determine the extent to which identified weather conditions can affect road conditions or operation of the autonomous vehicle. For example, if the autonomous vehicle is traveling on a curvy, mountain road and a rainstorm begins, the analysis component 108 can determine or infer that the autonomous vehicle will reduce speed. In another example, the analysis component 108 can utilize data received from wirelessly from services that provide real-time weather information or weather forecasts. For example, the analysis component 108 can determine or infer that the autonomous vehicle will be reducing speed if weather data indicates that snow will begin falling on autonomous vehicle's current route.

In another example, the analysis component 108 can utilize data received from systems or devices in the autonomous vehicle that monitor the operation or required maintenance of systems, devices or components of the autonomous vehicle. For example, if air pressure of one or more tires of the autonomous vehicle falls below a certain threshold, the analysis component 108 can determine or infer that the autonomous vehicle will reduce speed when making certain turns.

In another example, the analysis component 108 can utilize data received wirelessly from third party sources associated with events such as concerts, sporting events, festivals and the like that can affect the navigation selections made by the autonomous vehicle's navigation system due to anticipated traffic. In another example, the analysis component 108 can utilize data received wirelessly from third party sources associated with road construction or maintenance.

In an embodiment, the analysis component 108 can utilize data received wirelessly from an external traffic coordination system in order to determine or infer next action of the autonomous vehicle. For example, an external traffic coordination system can coordinate movement of multiple autonomous vehicles in a defined geographic area in order to optimize movement of each AV in reaching respective destination within the context of other vehicles.

In certain embodiments, the display component 110 can generates a graphical user interface that visually conveys the next action, wherein the graphical user interface comprises a shape that dynamically morphs to visually represent the next action. For example, one shape can morph into different shapes in order to represent next action such as a turn, braking or lane change or a change in direction, speed, acceleration, deceleration or the degree of a turn and the like. For example, as an autonomous vehicle approaches right turn, the shape generated by the display component 110 can dynamically morph into another shape to indicate next actions associated with changes in speed, direction and turn radius as the autonomous vehicle proceeds through the turn. Unlike static images, a shape that dynamically morphs into another shape can also convey next actions associated with changes in degree in speed, acceleration, deceleration, direction and turn radius in real time. In one example, as an autonomous vehicle decelerates into a turn to the right and then accelerates as the autonomous vehicle completes the turn and continues in substantially a straight direction, all changes associated with this movement by the autonomous vehicle can be visually represented by a shape that dynamically morphs to visually represent the next action. A passenger can quickly understand the next actions with just a glance at the morphing shape.

In certain embodiments, a shape generated by the display component 110 can comprise one or more types of shapes or combinations of shapes such as lines, angles, curves, polygons, circles, ellipses, non-geometrical shapes and the like. For example, a shape generated by the display component 110 can comprise an arrow in a form commonly used on street signs to indicate direction and can morph from a straight arrow to a curved arrow to indicate the autonomous vehicle will be turning. In another example, shapes of one or more types can morph into other types of shapes. For example, a shape generated by the display component 110 can comprise an arrow in a form commonly used on street signs to indicate forward movement and can morph into the form of a stop sign to indicate the autonomous vehicle will be coming to a stop.

In another example, the shape displayed by the display component 110 can comprise a horizontal line to visually represent a stationary autonomous vehicle. In this example, the horizontal line can dynamically morph to form a directional angle to visually represent the next action of the autonomous vehicle (see FIGS. 2A-2D below). The directional angle can take the form of two substantially straight lines connecting at a point. The distance of the connection point of the two substantially straight lines forming the directional angle from the original horizontal line can visually represent speed. As the distance of the connection point from the original horizontal line increases, it conveys an increase in speed. The rate of change can visually represent acceleration or deceleration. As the connection point of the two substantially straight lines moves horizontally to the left or the right, the directional angle changes to convey the change in direction of the autonomous vehicle. As the connection point moves to the far left or far right, the directional angle can convey the extent to which the autonomous vehicle is approaching its maximum turn radius. Speed, acceleration, deceleration, direction and turn radius can be conveyed and quickly understood with a glance at the graphical user interface generated by the display component 110 as the connection point moves, causing the directional angle to dynamically morph to indicate the next action of the autonomous vehicle. A return of the directional angle to the horizontal straight line can convey that the autonomous vehicle has stopped moving. Thus, with a horizontal line dynamically morphing to form a directional angle, the display component 110 can convey the next action of an autonomous vehicle the simultaneous degree of change of multiple variables. For example, as an autonomous vehicle approaches a turn by slowing down, then gradually turning the vehicle and then accelerating through the end of the turn, all of the changes in speed, acceleration, deceleration, direction and turn radius can be conveyed and quickly understood with a glance at the dynamically morphing directional angle generated by the display component 110.

In an embodiment, the shape displayed by the display component 110 can utilize color to visually represent the next action. For example, if the shape displayed by the display component 110 comprises a horizontal line that dynamically morphs to form a directional angle to visually represent the next action, the display component 110 can change the color of the directional angle to visually represent additional information association with next action. In one example, if an autonomous vehicle is slowing down due to factors such as bad weather or other safety factors, the color of the directional angle displayed by the display component 110 can change from white to red. In another example, the color of the directional angle displayed by the display component 110 can change from white to red when roads are slippery due to factors such as ice, snow, sleet or the like.

The shape displayed by the display component 110 can utilize line types to visually represent the next action. For example, substantially straight lines comprising a directional angle can dynamically morph into jagged lines to convey a bumpy road. In another example, substantially straight lines comprising a directional angle can dynamically morph into wavy lines to convey a slippery road.

The shape displayed by the display component 110 can comprise an arrow in shapes typically used in street signs that dynamically morphs to visually represent the next action. For example, an arrow pointing up can convey forward motion by the autonomous vehicle and an arrow curving to the right can convey a right turn. The length of the arrow can convey speed. In this example, the length of the arrow can dynamically morph as the autonomous vehicle begins to increase speed and can dynamically shorten as the autonomous vehicle begins to decrease speed. As the straight arrow dynamically morphs into an arrow curving to the right it visually represents the autonomous vehicle turning to the right.

In various embodiments, the display component 110 can include settings that enable a passenger to adjust the graphical user interface for characteristics such as type of shape, color, brightness, contrast and the like. The graphical user interface generated by the display component 110 can convey a notification to a driver of the autonomous vehicle to take control of the autonomous vehicle. The display component 110 can visually represent the next action as one or more projected images. For example, the shape visually representing the next action can be projected into the field of vision of a passenger in the driver's seat as a head up display.

In another embodiment, the display component 110 can visually represent the next action as one or more three-dimensional images. For example, if the shape used by the display component 110 can morph into the shape of a directional angle pointing upward to convey forward motion of the autonomous vehicle, the shape can be visually represented as a three-dimensional image with the directional angle pointing forward in a three-dimensional setting as opposed to pointing upward on a flat screen.

In yet another embodiment, the display component 110 can visually represent the next action in an augmented realty environment. For example, the display component 110 can overlay a geometric image onto the field of vision of a passenger of an autonomous vehicle. In one example, the display component 110 can generate a line that morphs into a directional angle in the passenger's field of vision with the directional angle overlaid onto the road and upcoming turns in the passenger's field of vision.

FIGS. 2A-2D respectively illustrate an example of a non-limiting system that facilitates displaying next action of an autonomous vehicle in accordance with one or more embodiments described herein. Repetitive description of like elements employed in other embodiments described herein is omitted for sake of brevity. FIGS. 2A-2D depict examples of a shape that can be displayed in a graphical user interface generated by the display component 110 that visually conveys the next action of an autonomous vehicle by dynamically morphing to form a directional angle to visually represent the next action. FIG. 2A depicts a shape 202a in the form of a substantially straight line positioned horizontally in the graphical user interface and visually represents the autonomous vehicle being at rest. FIG. 2B depicts shape 202b, in the form of an angle with vertex or apex 206 above the position of the horizontal line of shape 202a in FIG. 2A, with the opposite ends of line 208 that forms the angle located at the position of the graphical user interface of the horizontal line of shape 202a in FIG. 2A. In this example, the shape 202b is in the form of a directional angle pointing upward and visually represents the autonomous vehicle moving forward in substantially a straight line. FIG. 2C depicts shape 202c in the form of an inverted angle with apex (or vertex) 212 below the position of the horizontal line of shape 202a in FIG. 2A, with the opposite ends line 214 that forms the angle 202c located at the position of the graphical user interface of the horizontal line of shape 202a in FIG. 2A. In this example, the shape 202c is in the form of a directional angle pointing downward and visually represents the autonomous vehicle moving in reverse in substantially a straight line. FIG. 2D depicts a shape 202d in the form of a directional angle with vertex or apex 218 above the position of the horizontal line of shape 202a in FIG. 2A, with the opposite ends of line 220 that forms the angle located at the position of the graphical user interface of the horizontal line of shape 202a in FIG. 2A. In this example, however, the shape 202d is in the form of a directional angle pointing upward and to the right and visually represents the autonomous vehicle moving forward and turning to the right. Passengers of the autonomous vehicle will see the shape 202a in the form of a straight, horizontal line when the autonomous vehicle is stationary. As the autonomous vehicle is about to move forward in substantially a straight line, the shape 202a (FIG. 2A) will morph into the form of a directional angle pointing upward of shape 202b (FIG. 2B). As the autonomous vehicle is about to make a turn to the right, the shape 202b will morph into the form of a directional angle pointing upward and to the right of shape 202d (FIG. 2D). If the autonomous vehicle stops and then begins to move in reverse in substantially a straight line, passengers of the autonomous vehicle will see a shape in the form of substantially a straight line of shape 202a (FIG. 2A) that morphs into the form of a directional angle pointing downward of shape 202c (FIG. 2C) and visually represents the autonomous vehicle moving in reverse in substantially a straight line.

FIGS. 3A-3D respectively illustrate another example of a non-limiting system that facilitates displaying next action of an autonomous vehicle in accordance with one or more embodiments described herein. Repetitive description of like elements employed in other embodiments described herein is omitted for sake of brevity. FIGS. 3A-3D depict examples of a shape that can be displayed in a graphical user interface generated by the display component 110 that visually conveys the next action of an autonomous vehicle by dynamically morphing to form a directional angle to visually represent the next action. FIG. 3A illustrates a shape 302a in the form of a substantially straight line positioned horizontally in the graphical user interface and visually represents the autonomous vehicle being at rest. FIG. 3B depicts a shape 302b in the form of an angle with vertex or apex 306 above the position of the horizontal line of shape 302a in FIG. 3A, with the opposite ends of line 308 that forms the angle 302b located at the position of the graphical user interface of the horizontal line of shape 302a in FIG. 3A. In this example, the shape 302b is in the form of a directional angle pointing upward and visually represents the autonomous vehicle moving forward. FIG. 3C depicts a shape 302c in the form of an angle with vertex or apex 312 above the position of the vertex or apex 306 of shape 302b in FIG. 3B, with the opposite ends of line 314 that forms the angle located at the position of the graphical user interface of the horizontal line of shape 302a in FIG. 3A. In this example, the shape 302c is in the form of a directional angle pointing upward and visually represents the autonomous vehicle moving forward at a speed greater than the speed depicted in shape 302b (FIG. 3B). FIG. 3D depicts a shape 302d in the form of an angle with vertex or apex 318 above the position of the vertex or apex 312 of shape 302c in FIG. 3C, with the opposite ends of line 320 that forms the angle located at the position of the graphical user interface of the horizontal line of shape 302a in FIG. 3A. In this example, the shape 302d is in the form of a directional angle pointing upward and visually represents the autonomous vehicle moving forward at a speed greater than the speed depicted by shapes 302b or 302c. As the autonomous vehicle is about to move forward, the shape 302a (FIG. 3A) will morph into the form of a directional angle pointing upward of shape 302b (FIG. 3B). As the autonomous vehicle is about to increase speed as the autonomous vehicle continues to move forward in substantially a straight line, the shape 302b (FIG. 3B) will continue to morph (e.g., smaller angle) into figure the shape 302c (FIG. 3C). As the autonomous vehicle is about to further increase speed as it continues to move forward, the shape 302c (FIG. 3C) will continue to morph (at an even smaller angle) into the shape 302d (FIG. 3D). If the autonomous vehicle then decreases speed as it continues to move forward, the shape 302d (FIG. 3D) will morph back (at a larger angle) into shape 302c (FIG. 3C).

Thus, the shape (for example, 302a, 302b, 302c and/or 302d) dynamically morphs to represent in real-time next action and degree of action. As the AV speeds up, the shape points in the direction of an angle vertex and the angle becomes smaller, tighter, longer to reflect acceleration. As the AV slows down the shape dynamically morphs to widen the angle and will flatten to a line in a stopped or steady state position. Thus, the shape provides in a glanceable manner next actions and degree thereof.

Figure 4A:
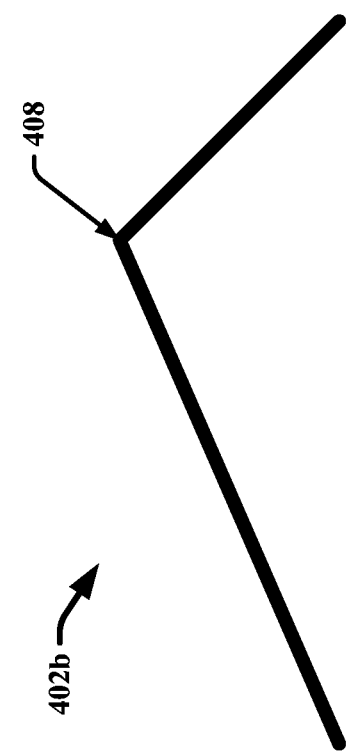
FIGS. 4A-4D respectively illustrate yet another example of a non-limiting system that facilitates displaying next action of an autonomous vehicle in accordance with one or more embodiments described herein.
Figure 4B:
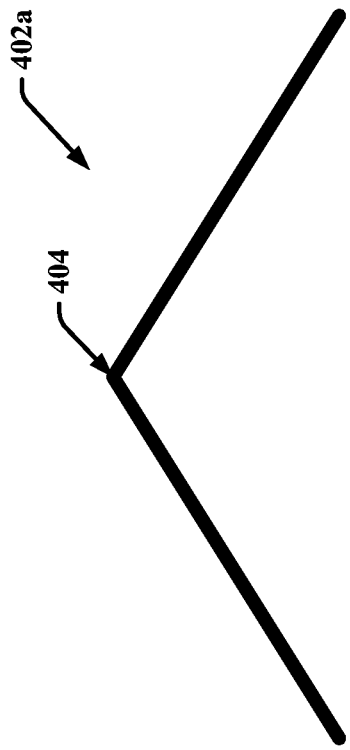
Figure 4C:
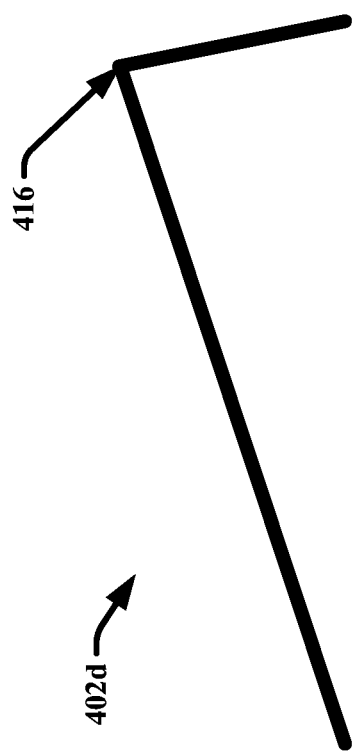
Figure 4D:
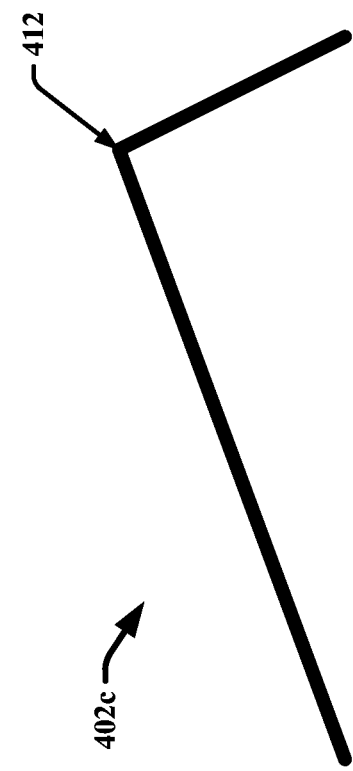

FIGS. 4A-4D respectively illustrate yet another example of a non-limiting system that facilitates displaying next action of an autonomous vehicle in accordance with one or more embodiments described herein. Repetitive description of like elements employed in other embodiments described herein is omitted for sake of brevity. FIGS. 4A-4D depict examples of a shape that can be displayed in a graphical user interface generated by the display component 110 that visually conveys the next action of an autonomous vehicle by dynamically morphing to form a directional angle to visually represent the next action. FIG. 4A depicts a shape 402a in the form of an angle with vertex or apex 404. In this example, the shape 402a is in the form of a directional angle pointing upward and visually represents the autonomous vehicle moving forward. FIG. 4B depicts a shape 402b in the form of an angle with vertex or apex 408 located to the right of the position of the vertex or apex 404 in FIG. 4A. In this example, the shape 402b is in the form of a directional angle pointing upward and to the right and visually represents the autonomous vehicle moving forward and turning to the right. FIG. 4C depicts shape 402c in the form of an angle with vertex or apex 412 located to the right of the position of the vertex or apex 408 in FIG. 4B. In this example, the shape 402c is in the form of a directional angle pointing upward and to the right and visually represents the autonomous vehicle moving forward and turning to the right with a sharper turn radius than the example depicted by shape 402b (FIG. 4B). FIG. 4D depicts a shape 402d in the form of an angle with vertex or apex 416 located to the right of the position of the vertex or apex 412 in FIG. 4C. In this example, the shape 402d is in the form of a directional angle pointing upward and to the right and visually represents the autonomous vehicle moving forward and turning to the right with a sharper turn radius than the example depicted by shape 402c (FIG. 4C). As the autonomous vehicle is moving forward in substantially a straight line, the shape 402a (FIG. 4A) will morph into the form of a directional angle pointing upward and to the right of shape 402b (FIG. 4B) as the autonomous vehicle is about to begin turning right. As the AV is about to continue the turn to the right at a sharper turn angle, the shape 402b (FIG. 4B) will continue to morph into shape 402c (FIG. 4C). As the autonomous vehicle is about to further continue the turn to the right at a sharper turn angle, the shape 402c (FIG. 4C) will continue to morph into shape 402d (FIG. 4D). As the autonomous vehicle begins to complete the right turn and return to moving forward in substantially a straight line, the shape 402d (FIG. 4D) will morph into shape 402c (FIG. 4C), which will then morph into shape 402b (FIG. 4B), which will then morph into shape 402a (FIG. 4A).

Figure 5A:
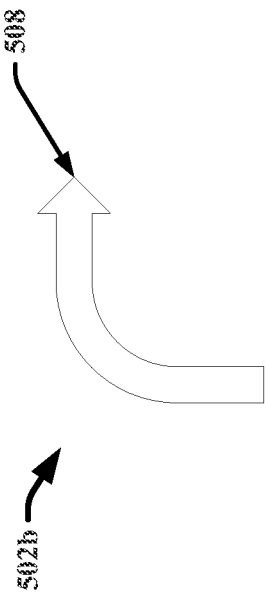
FIGS. 5A-5D respectively illustrate yet another example of a non-limiting system that facilitates displaying next action of an autonomous vehicle in accordance with one or more embodiments described herein.
Figure 5B:
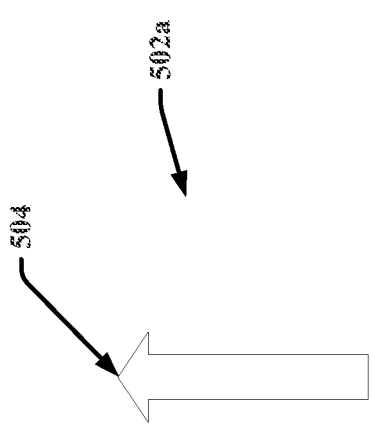
Figure 5C:
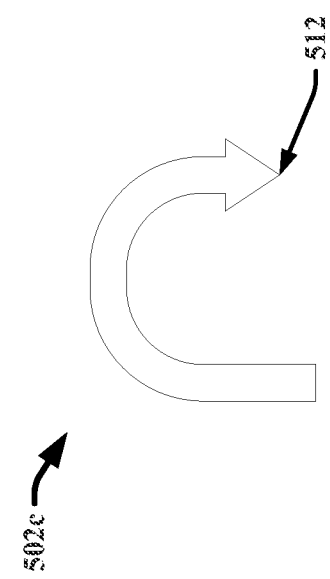
Figure 5D:
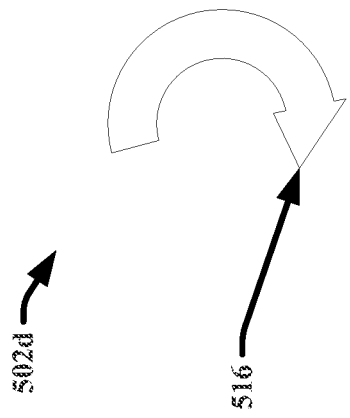

FIGS. 5A-5D respectively illustrate yet another example of a non-limiting system that facilitates displaying next action of an autonomous vehicle in accordance with one or more embodiments described herein. Repetitive description of like elements employed in other embodiments described herein is omitted for sake of brevity. FIGS. 5A-5D depict examples of a shape in the form of an arrow in shapes typically used in street signs that can be displayed in a graphical user interface generated by the display component 110 that visually conveys the next action of an autonomous vehicle by dynamically morphing to alter the direction of the arrow. FIG. 5A depicts a shape 502a in the form of an arrow pointing up 504 that visually represents forward motion by the autonomous vehicle. FIG. 5B depicts a shape 502b in the form of an arrow curving to the right 508 that visually represents the autonomous vehicle turning to the right. FIG. 5C depicts shape 502c in the form of an arrow curving downward 512 with the curve of the arrow forming a semi-circle that visually represents the autonomous vehicle continuing a turn in substantially the form of a semi-circle. FIG. 5D depicts a shape 502d in the form of an arrow curving to the left 516 with the curve of the arrow forming a semi-circle that visually represents the autonomous vehicle continuing a turn in substantially the form of a semi-circle. As the autonomous vehicle is moving forward in substantially a straight line, the shape 502a (FIG. 5A) in the form of an arrow pointing upward will morph into the form of an arrow curving to the right 502b (FIG. 5B) as the autonomous vehicle is about to begin turning right. In this example, the autonomous vehicle is turning onto an on ramp to a freeway. As the autonomous vehicle continues to turn to the right through the on ramp, the shape 502b (FIG. 5B) will continue to morph into shape 502c (FIG. 5C). As the autonomous vehicle continues to turn to the right through the on ramp, the shape 502c (FIG. 5C) will continue to morph into shape 502d (FIG. 5D). As the autonomous vehicle begins to complete the turn through the on ramp onto the freeway, the shape 502d (FIG. 5D) will morph into shape 502a (FIG. 5A) as the autonomous vehicle is about to begin moving in substantially a forward direction.

Figure 6:
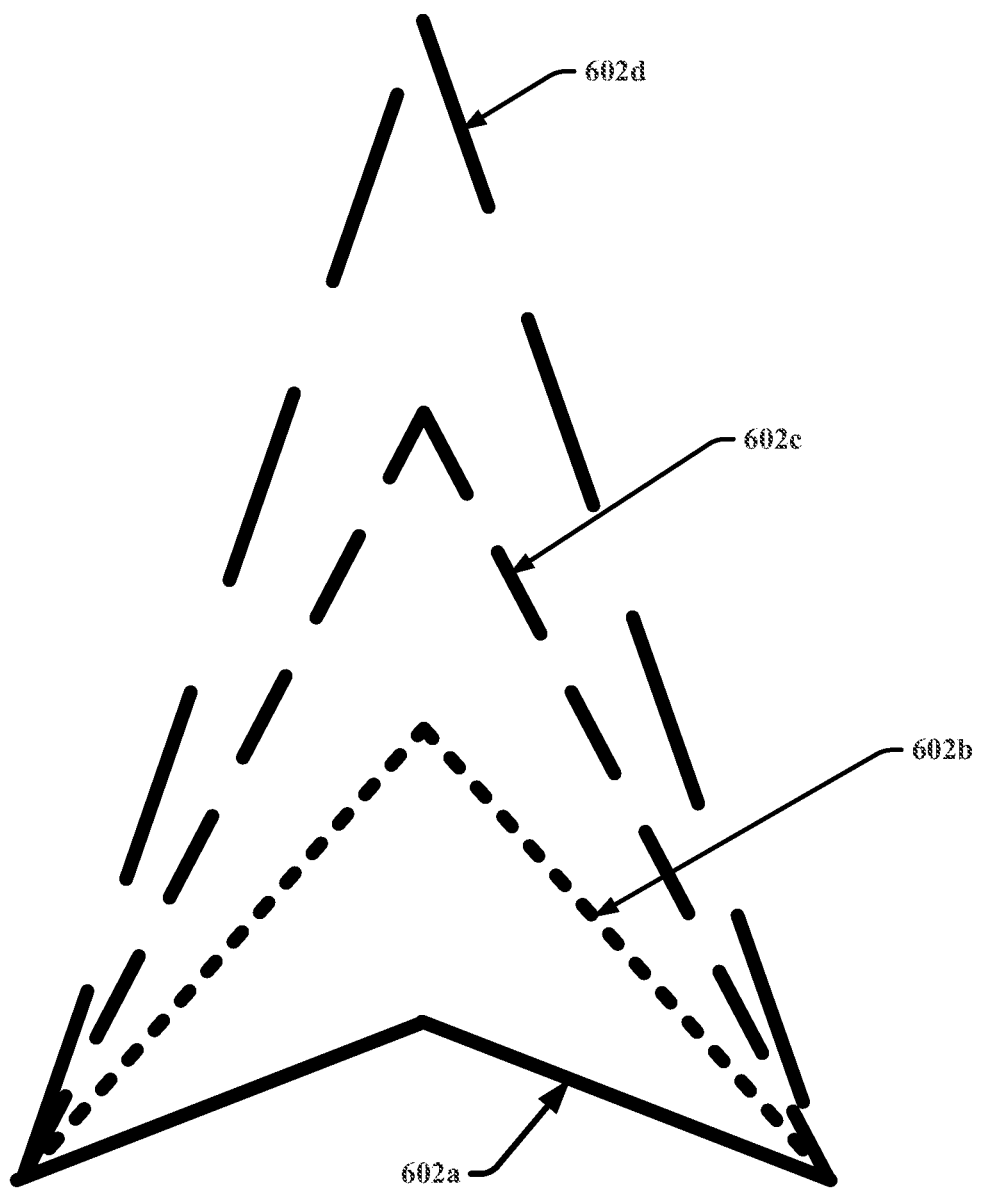
FIG. 6 illustrates yet another example of a non-limiting system that facilitates displaying next action of an autonomous vehicle in accordance with one or more embodiments described herein.

FIG. 6 illustrates another example of a non-limiting system that facilitates displaying next action of an autonomous vehicle in accordance with one or more embodiments described herein. Repetitive description of like elements employed in other embodiments described herein is omitted for sake of brevity. FIG. 6 depicts examples of a shape that can be displayed in a graphical user interface generated by the display component 110 that visually conveys the next action of an autonomous vehicle by dynamically morphing to form a directional angle to visually represent the next action. FIG. 6 depicts a shape 602a in the form of a directional angle pointing upward to visually represent the autonomous vehicle moving forward in substantially a straight line. FIG. 6 also depicts shapes 602b, 602c and 602d in the form of directional angles pointing upward to visually represent the autonomous vehicle moving forward in substantially a straight line. In this example, an increase in the height of a directional angle pointing upward visually represents an increase in speed as the next action of the autonomous vehicle. As shape 602a morphs into shape 602b, then 602c and then 602d, the morphing shape 602 visually represents the autonomous vehicle increasing in speed as it moves forward in substantially a straight line. In this example, changes in color of the lines forming the directional angle will indicate changes in acceleration or deceleration as part of the next action of the autonomous vehicle. If the autonomous vehicle will be accelerating, the color of the directional angle will change to a shade of green. If the autonomous vehicle will be decelerating, the color of the directional angle will change to a shade of red. In FIG. 6, the dashed lines represent a change in color from a default color to green or red. The longer dashes in a line represent a darker shade of either green or red. For example, shape 602 visually represents the autonomous vehicle moving forward. As the autonomous vehicle is about to accelerate as it moves forward, shape 602a morphs into shape 602b to visually indicate an increase in speed and changes color from the default color to a light shade of green to visually indicate acceleration. As the autonomous vehicle is about to continue to accelerate at a faster rate as it moves forward, shape 602b morphs into shape 602c which becomes a darker shade of green, and then morphs into shape 602d which becomes an even darker shade of green. If the autonomous vehicle reaches a top speed visually represented by shape 602d, then the color of shape 602d would change from a dark shade of green to the default color to indicate that acceleration will cease. In another example, if analysis component 108 determines that traffic is much slower up ahead, the autonomous vehicle will begin to rapidly decelerate, and the rate of deceleration will decrease as the autonomous vehicle approaches the slower traffic ahead until it reaches a speed that is optimal for the slower traffic. As the autonomous vehicle is about to decelerate as it continues to move forward, shape 602d morphs into shape 602c to visually indicate a decrease in speed and changes color from the default color to a dark shade of red to visually indicate rapid deceleration. As the autonomous vehicle is about to continue to decelerate at a slower rate as it continues to move forward, shape 602c morphs into shape 602b which becomes a lighter shade of red, and then morphs into shape 602a which becomes an even lighter shade of red. Once the autonomous vehicle reaches the optimal speed for the slower traffic visually represented by shape 602a, then the color of shape 602a would change from a light shade of red to the default color to indicate that deceleration will cease.

Figure 7:
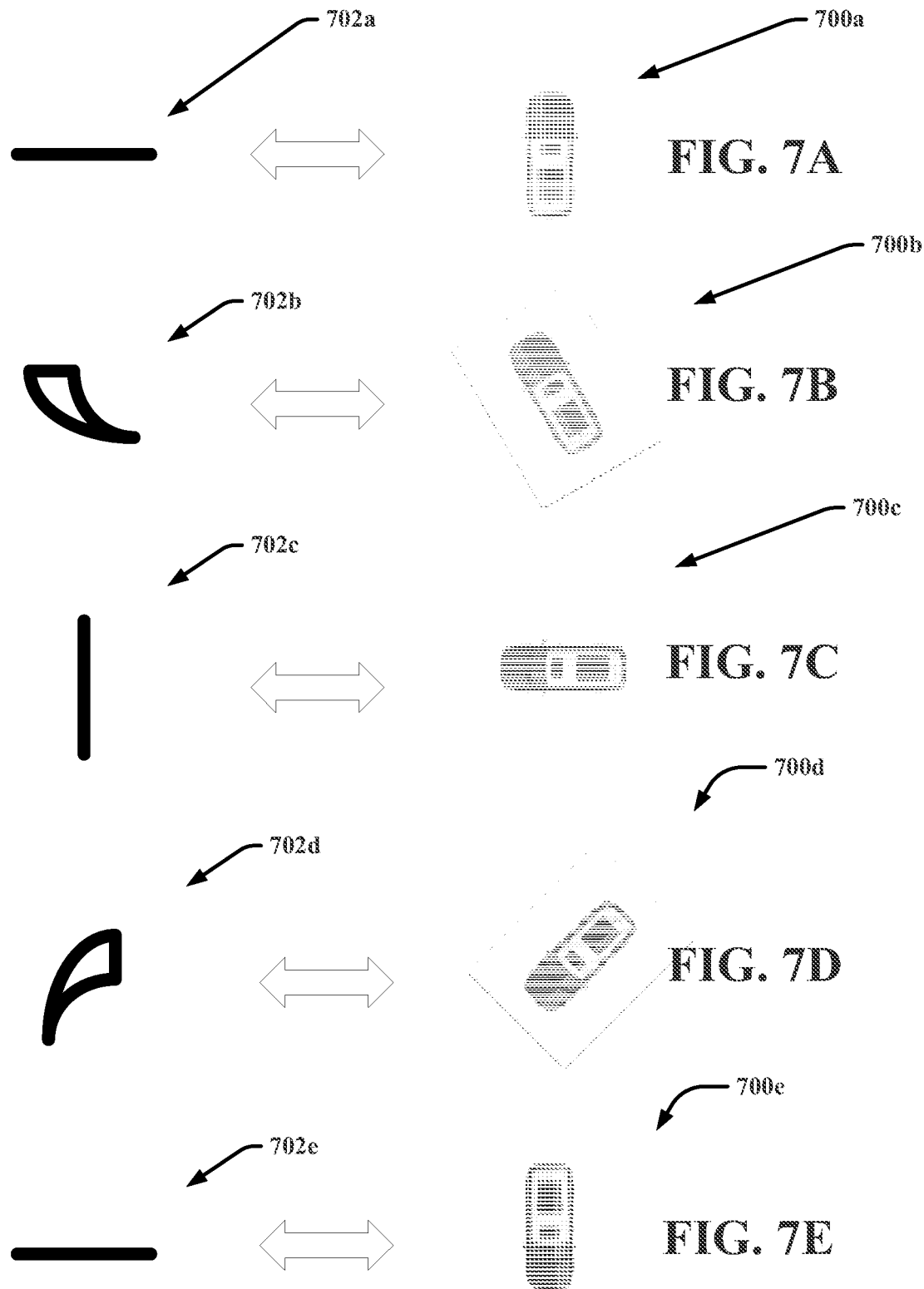
FIGS. 7A-7E respectively illustrate yet another example of a non-limiting system that facilitates displaying next action of an autonomous vehicle in accordance with one or more embodiments described herein.

FIGS. 7A-7E respectively illustrate yet another example of a non-limiting system that facilitates displaying next action of an autonomous vehicle in accordance with one or more embodiments described herein. Repetitive description of like elements employed in other embodiments described herein is omitted for sake of brevity. FIGS. 7A-7E depict examples of shapes that visually represent the next action of an autonomous vehicle on the left side of each figure. FIGS. 7A-7E depict examples of the position of the autonomous vehicle as an image on the right side of each figure corresponding to the shape that visually represents the next action. In these examples, the position of each shape representing next action will adjust to reflect North-South and East-West directions, with upward direction representing North, downward direction representing South, rightward direction representing East and leftward direction representing West. FIG. 7A depicts an autonomous vehicle 700a facing North and at rest, and the shape 702a representing next action is a horizontal line. FIG. 7B depicts the next action of the autonomous vehicle 700b which will be backing up and turning to the right. The image of the autonomous vehicle 700b on the right depicts the position of the autonomous vehicle 700b as it is proceeding through the reverse turn. The shape 702b representing this next action is a curved directional arrow pointing downward and to the right. The horizontal line of shape 702a depicted in FIG. 7A morphs into the curved directional arrow of shape 702b depicted in FIG. 7B as the autonomous vehicle is about to make the reverse turn. FIG. 7C depicts the next action of the autonomous vehicle 700c which will be stopping once it completes the reverse turn. Once stopped the vehicle will be facing West, and the shape 702c visually representing that next action is a vertical line. The curved directional arrow of shape 702b depicted in FIG. 7B morphs into the vertical line of shape 702c depicted in FIG. 7C as the autonomous vehicle 700c is about to stop. FIG. 7D depicts the next action of the autonomous vehicle 700d which will be moving forward and turning to the left. The image of the autonomous vehicle 700d on the right depicts the position of the autonomous vehicle 700d as it is proceeding through the left turn. The shape 702d representing this next action is a curved directional arrow pointing to the left and downward. The vertical line of shape 702c depicted in FIG. 7C morphs into the curved directional arrow of shape 702d depicted in FIG. 7D as the autonomous vehicle 700d is about to make the left turn. FIG. 7E depicts the next action of the autonomous vehicle 700e which will be stopping once it completes the left turn. Once stopped the vehicle will be facing South, and the shape 702e visually representing that next action is a horizontal line. The curved directional arrow of shape 702d depicted in FIG. 7D morphs into the horizontal line of shape 702e depicted in FIG. 7E as the autonomous vehicle 700e is about to stop.

Figure 8:
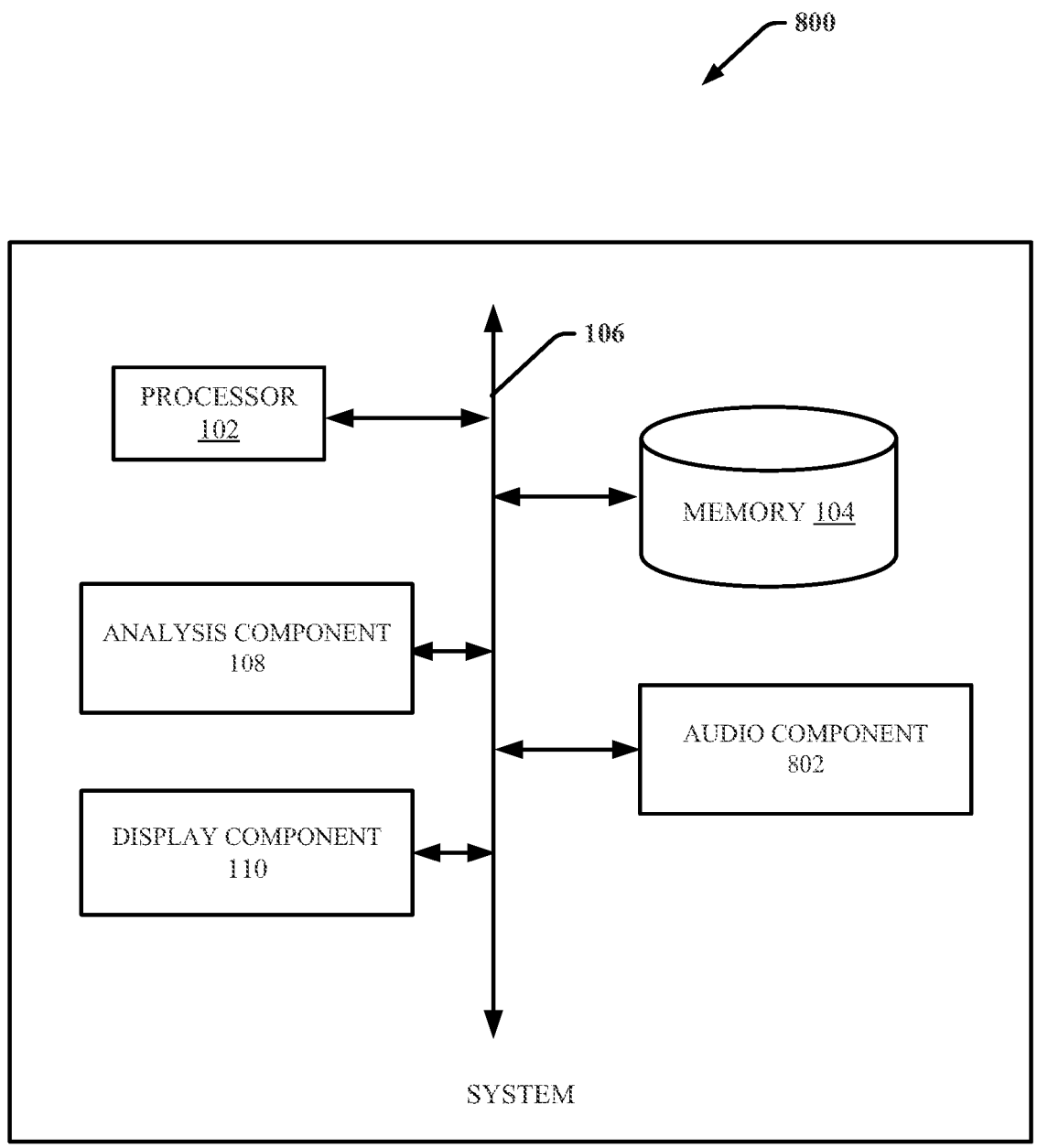
FIG. 8 illustrates a block diagram of another example, non-limiting system that facilitates displaying next action of an autonomous vehicle in accordance with one or more embodiments described herein.

FIG. 8 illustrates a block diagram of another example, non-limiting system 800 that facilitates displaying next action of an autonomous vehicle in accordance with one or more embodiments described herein. Repetitive description of like elements employed in other embodiments described herein is omitted for sake of brevity. In certain embodiments, the system 800 includes an audio component 802 that can generate audio notifications of the next action. For example, the audio component 802 that can generate audio notifications of each next action conveyed by the display component 110. In another example, the audio component 802 that can generate audio notifications of certain types of next action conveyed by the display component 110. In this example, a passenger can determine which types of next action will generate an audio notification. For example, the audio component 802 can include settings that can be selected by a passenger that will cause audio notifications to be generated by the audio component 802 only for a next action that includes a sudden movement such as a sudden, sharp turn or sudden braking to avoid an obstruction.

In another embodiment, the audio component 802 can include settings that enable a passenger to adjust the audio notifications for characteristics such as language, volume, voice type and the like.

In another embodiment, the audio component 802 can generate audio notifications that can supplement information conveyed by the display component 110. For example, the audio component 802 can generate audio notifications that explain why certain next actions will occur such as weather or traffic conditions.

Figure 9:
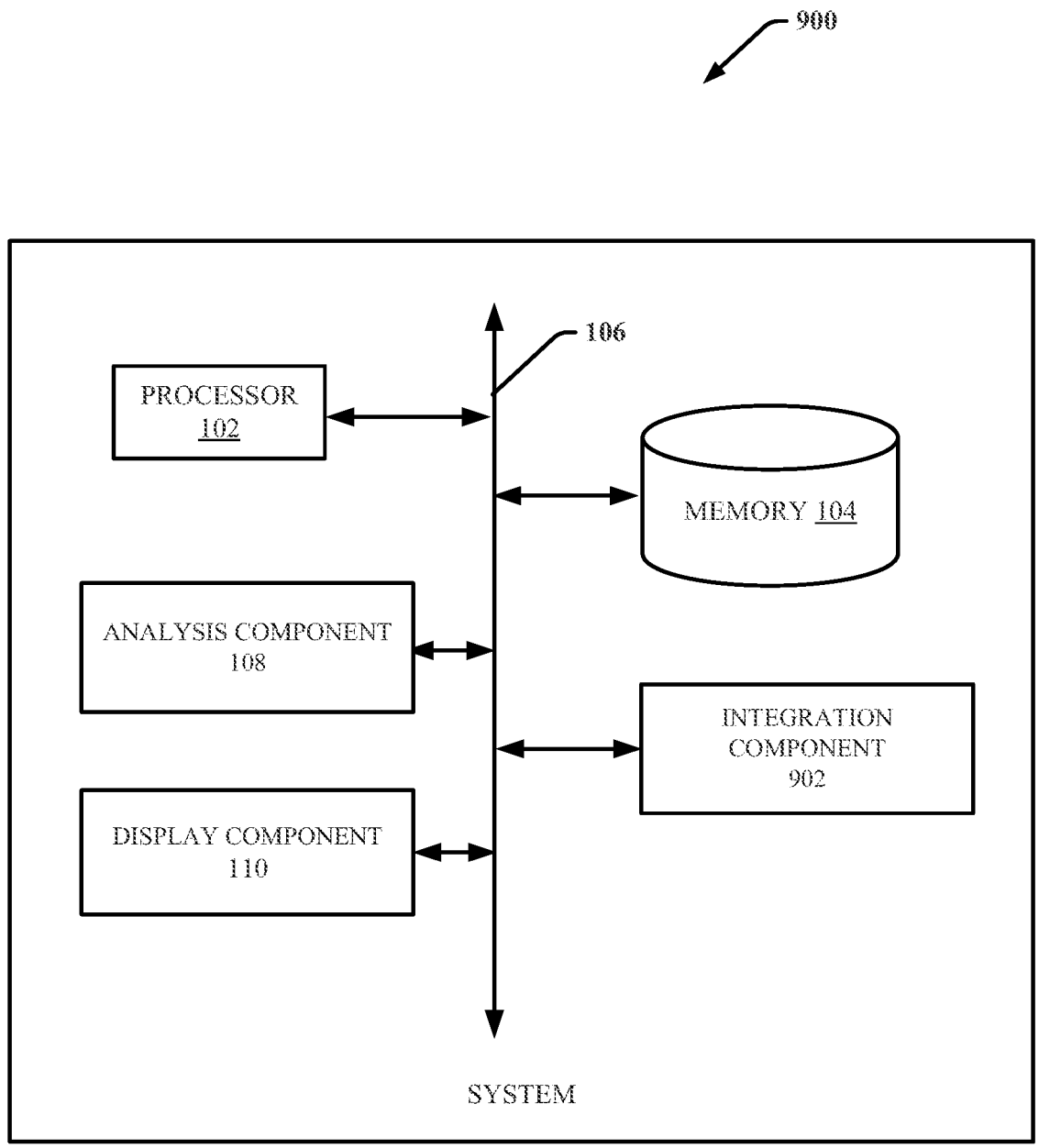
FIG. 9 illustrates a block diagram of yet another example, non-limiting system that facilitates displaying next action of an autonomous vehicle in accordance with one or more embodiments described herein.

FIG. 9 illustrates a block diagram of another example, non-limiting system 900 that facilitates displaying next action of an autonomous vehicle in accordance with one or more embodiments described herein. Repetitive description of like elements employed in other embodiments described herein is omitted for sake of brevity. In certain embodiments, the system 900 includes an integration component 902 that can integrate the system 900 with other visualization tools. For example, the system 900 can be integrated by the integration component 902 into a wireless mobile device such as a smartphone, tablet computer or the like in order to display the graphical user interface generated by the display component 110. In another example, the integration component 902 can integrate the system 900 with lighting devices in the autonomous vehicle that can alert passengers when certain types of actions will be taken by the autonomous vehicle. For example, certain lights in the autonomous vehicle can change color or emit a flashing light when actions such as sharp turns are approaching.

Figure 10:
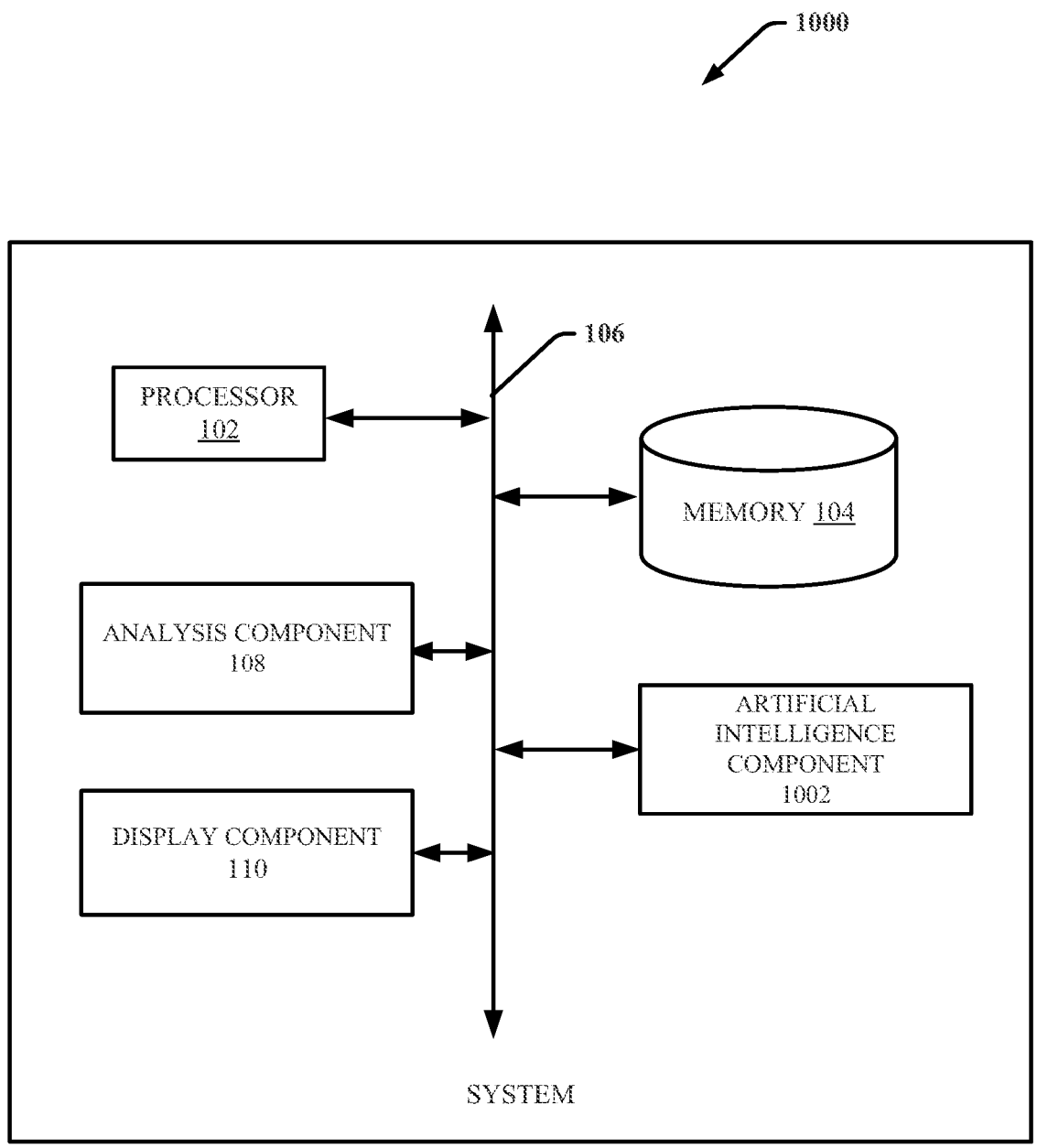
FIG. 10 illustrates a block diagram of yet another example, non-limiting system that facilitates displaying next action of an autonomous vehicle in accordance with one or more embodiments described herein.

FIG. 10 illustrates a block diagram of another example, non-limiting system that facilitates displaying next action of an autonomous vehicle in accordance with one or more embodiments described herein. Repetitive description of like elements employed in other embodiments described herein is omitted for sake of brevity. In certain embodiments, the system 1000 includes an artificial intelligence component 1002 that can facilitate the determination or inference of the next action of an autonomous vehicle by the analysis component 108. For example, the artificial intelligence component 1002 can detect a pattern that pedestrians or cyclists are often present at a location on a common route taken by the autonomous vehicle at certain times on certain days. In this example, the pattern detected by the artificial intelligence component 1002 can facilitate an inference by the analysis component 108 that the autonomous vehicle will be slowing down at it approaches the location.

In another example, the artificial intelligence component 1002 can detect a pattern of how certain types of weather conditions can affect the operation of the autonomous vehicle on a particular road. For example, the artificial intelligence component 1002 can detect a pattern that rain makes a certain road very slippery that typically requires the autonomous vehicle to engage its traction control system. In this example, the pattern detected by the artificial intelligence component 1002 can facilitate an inference by the analysis component 108 that the autonomous vehicle will be moving more slowly on the road when it is raining.

In another example, the artificial intelligence component 1002 can detect a pattern that an autonomous vehicle's traction control system is less effective when the weight of the autonomous vehicle associated with passengers and cargo exceeds a certain weight. In this example, the artificial intelligence component 1002 can train the analysis component 108 to take into account the aggregate weight of passengers and cargo with regard to certain types of next actions determined or inferred by the analysis component 108.

In another example, the artificial intelligence component 1002 can employ crowdsourcing to facilitate the determination or inference of the next action of an autonomous vehicle by the analysis component 108. For example, the artificial intelligence component 1002 can utilize data associated with how similar autonomous vehicles operate in certain locations under various conditions and detect patterns that can facilitate the determination or inference of the next action of an autonomous vehicle by the analysis component 108. In one example, the artificial intelligence component 1002 can determine or infer the optimal speed for an autonomous vehicle on certain curvy, mountain roads based upon data compiled from similar autonomous vehicles that have traveled such roads.

In this regard, the artificial intelligence component 1002 can perform classifications, correlations, inferences and/or expressions associated with principles of artificial intelligence. For instance, the artificial intelligence component 1002 can employ an automatic classification system and/or an automatic classification. In one example, the artificial intelligence component 1002 can employ a probabilistic and/or statistical-based analysis (e.g., factoring into the analysis utilities and costs) to learn and/or generate inferences. The artificial intelligence component 1002 can employ any suitable machine-learning based techniques, statistical-based techniques and/or probabilistic-based techniques. For example, the artificial intelligence component 1002 can employ expert systems, fuzzy logic, SVMs, Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. In another aspect, the artificial intelligence component 1002 can perform a set of machine learning computations. For example, the artificial intelligence component 1002 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations.

Figure 11:
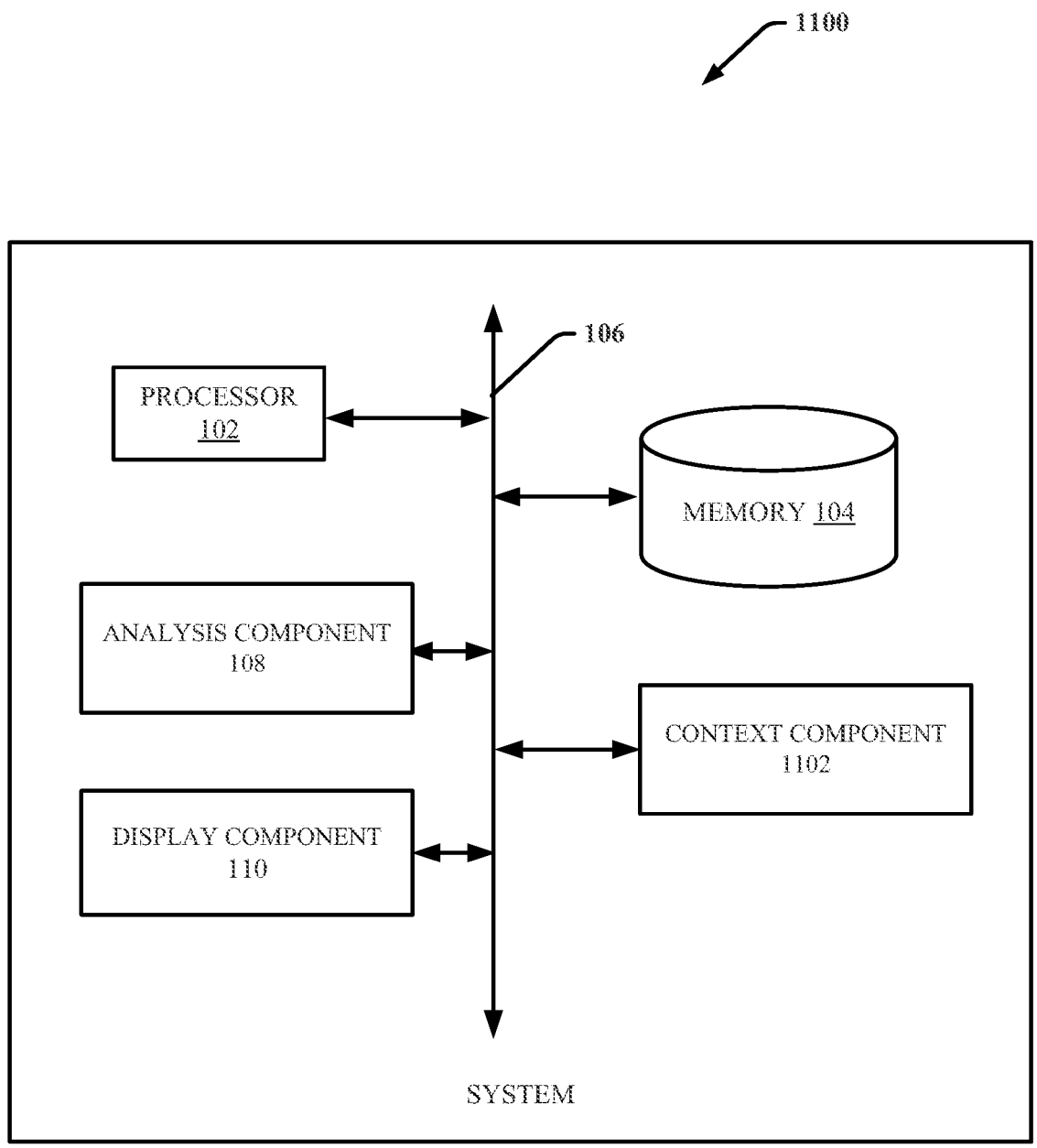
FIG. 11 illustrates a block diagram of yet another example, non-limiting system that facilitates displaying next action of an autonomous vehicle in accordance with one or more embodiments described herein.

FIG. 11 illustrates a block diagram of another example, non-limiting system that facilitates displaying next action of an autonomous vehicle in accordance with one or more embodiments described herein. Repetitive description of like elements employed in other embodiments described herein is omitted for sake of brevity. In certain embodiments, the system 1100 includes a context component 1102 that can monitor context of an autonomous vehicle or passengers of the autonomous vehicle. For example, the context component 1102 can determine preferences of one or more passengers that can be utilized by the analysis component 108 to determine or infer next action of the autonomous vehicle. In one example, the context component 1102 can determine if one or more passengers have a preference for speed over comfort. A passenger traveling to an important business meeting or a group of passengers traveling to a play can have a preference for arriving on time over the comfort of the trip. In this example, the context component 1102 can determine that a faster but less comfortable route that includes bumpy roads and sharp turns can be selected over a more comfortable route that will take longer, and the analysis component 108 can utilize this information associated with route selection to determine or infer next action.

In another example, a passenger can be more prone to motion sickness and more sensitive to bumpy roads or sharp turns. In this example, the context component 1102 can determine that comfort will be prioritized for route selections made for such passenger.

In another example, the context component 1102 can utilize data obtained by syncing with a smartphone or other external user device of one or more passengers to determine preferences of one or more passengers that can be utilized by the analysis component 108 to determine or infer next action of the autonomous vehicle. For example, an addition to a passenger's calendar associated with an important meeting can be utilized by the context component 1102 to infer that the passenger will have a preference for speed over comfort in order to be on time for the meeting.

In certain embodiments, the context component 1102 can identify one or more passengers of an autonomous vehicle and log data associated with each passenger. In one example, the context component 1102 can identify frequent passengers of an autonomous vehicle based upon profiles created by the context component 1102 of frequent passengers. For example, with respect to an autonomous vehicle used by a family, the context component 1102 can create profiles of each family member. In one example, information used by the context component 1102 to create profiles can be collected using questionnaires. In another example, the context component 1102 can utilize third party sources of information such as driver or passenger insurance data. Profiles of drivers can also be updated over time by logging a passenger's history of using the autonomous vehicle. In another example, the context component 1102 can identify a frequent passenger using a variety of factors. For example, the context component 1102 can identify a frequent passenger using cameras and facial recognition systems. In another example, the context component 1102 can ask or confirm the identity of a passenger using prompts in the autonomous vehicle's touch screen controls. In another example, the context component 1102 can identify a frequent passenger by syncing with the passenger's smartphone or other external user device. In another example, using profiles of frequent passengers, the context component 1102 can log data such as a passenger's preferences associated with the operation of the autonomous vehicle or routes selected by the autonomous vehicle.

Figure 12:
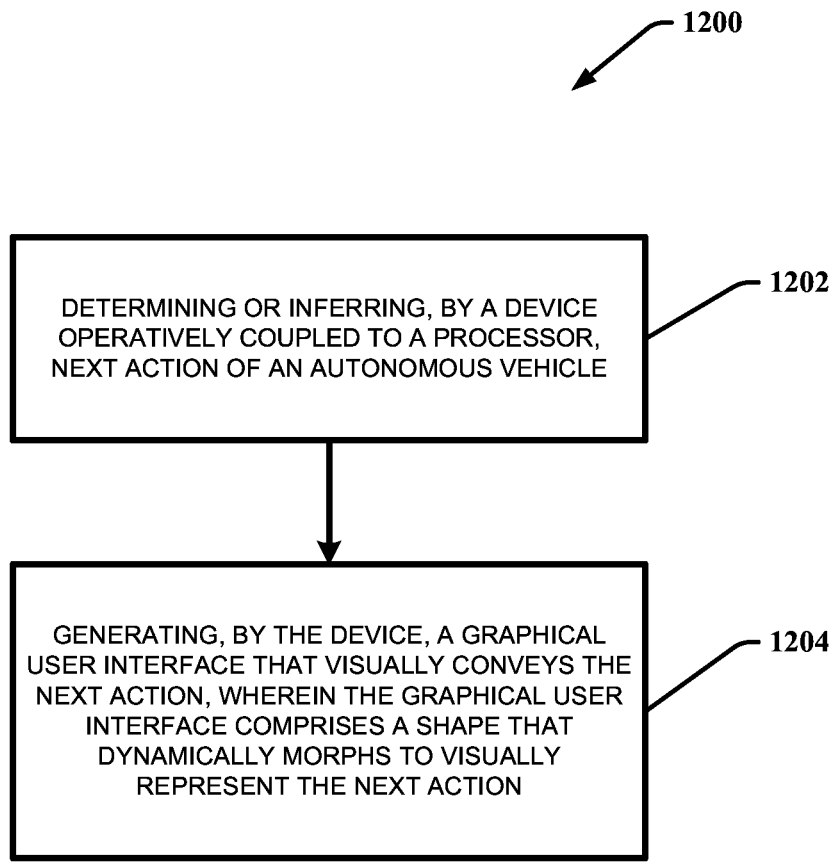
FIG. 12 illustrates a flow diagram of an example of a method to facilitate displaying next action of an autonomous vehicle in accordance with one or more embodiments described herein.

FIG. 12 illustrates a flow diagram of an example of a method to facilitate displaying next action of an autonomous vehicle in accordance with one or more embodiments described herein. Repetitive description of like elements employed in other embodiments described herein is omitted for sake of brevity. Box 1202 represents a first act that includes determination or inference of next action of an autonomous vehicle (e.g., via the analysis component 108). At box 1204, a graphical user interface that visually conveys the next action is generated, wherein the graphical user interface comprises a shape that dynamically morphs to visually represent the next action (e.g., via the display component 110).

In certain embodiments, at box 1204, the shape comprises a horizontal line to visually represent a stationary autonomous vehicle. In another embodiment, at box 1204, the shape comprises a horizontal line that dynamically morphs to form a directional angle to visually represent the next action.

Figure 13:
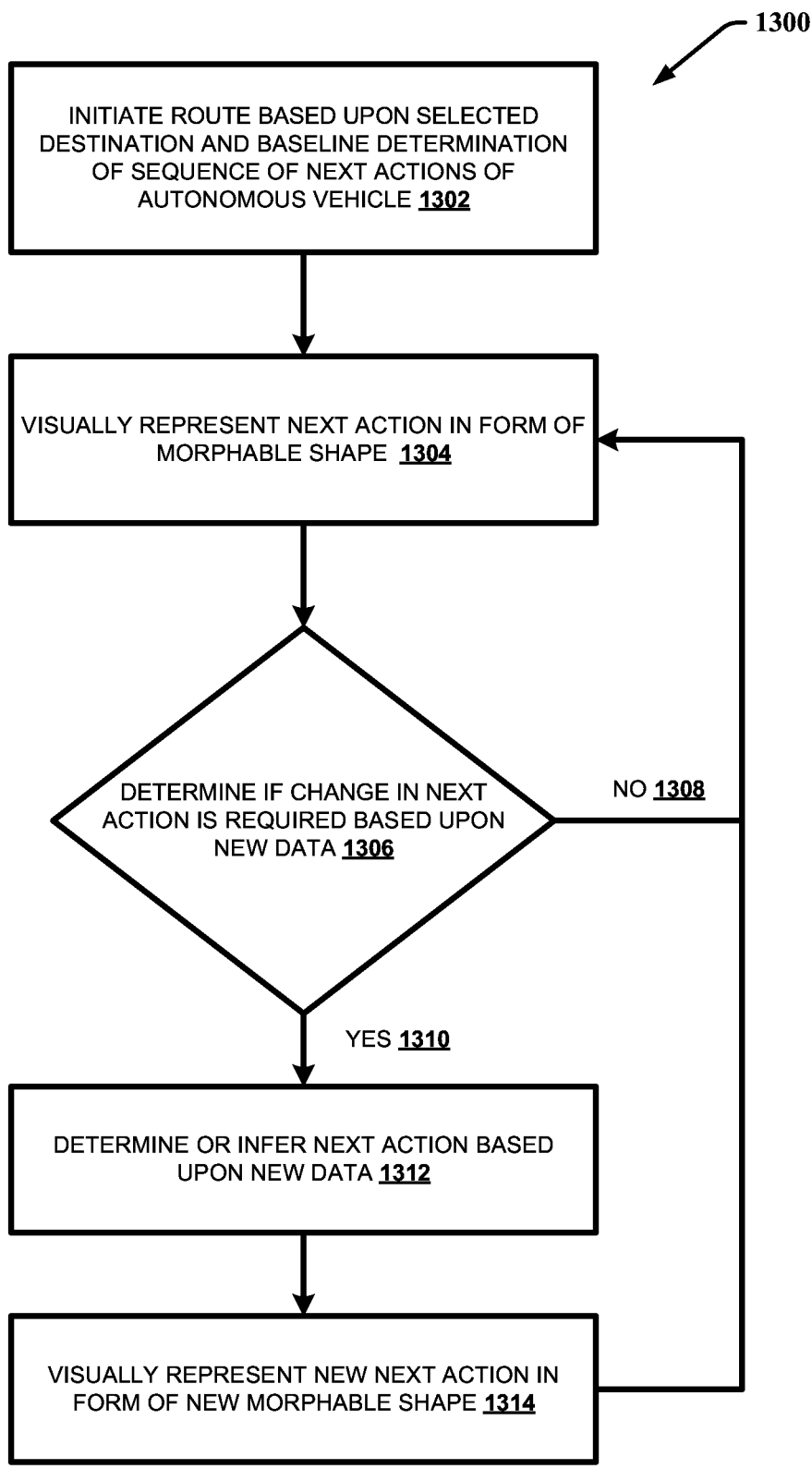
FIG. 13 illustrates a flow diagram of an example of a method to facilitate displaying next action of an autonomous vehicle in accordance with one or more embodiments described herein.

FIG. 13 illustrates another basic method flowchart 1300 of functional acts within various embodiments. Repetitive description of like elements employed in other embodiments described herein is omitted for sake of brevity. The method to facilitate displaying next action of an autonomous vehicle illustrated in FIG. 13 can be implemented in the system 100 of FIG. 1. As such, reference is to be made to the example of FIG. 1 in the following discussion of the example of FIG. 13.

Thus, in the example of FIG. 13, a sequence to facilitate displaying next action of an autonomous vehicle 1300 is outlined. The sequence begins at box 1302 where a route is initiated based upon a selected destination and baseline determination of sequence of next actions of the autonomous vehicle. At box 1304, next action is visually represented in the form of a morphable shape. At decision box 1306, it is determined if a change in next action is required based upon new data. For example, the presence of pedestrians, cyclists, obstructions or other vehicles can be detected that can affect the next action of the autonomous vehicle. If no new data is detected (decision path 1308), the next action at box 1304 is unchanged. If new data is detected (decision path 1310), at box 1312, next action is determined or inferred based upon the new data. At box 1314, the new next action is visually represented in the form of a new morphable shape.

Figure 14:
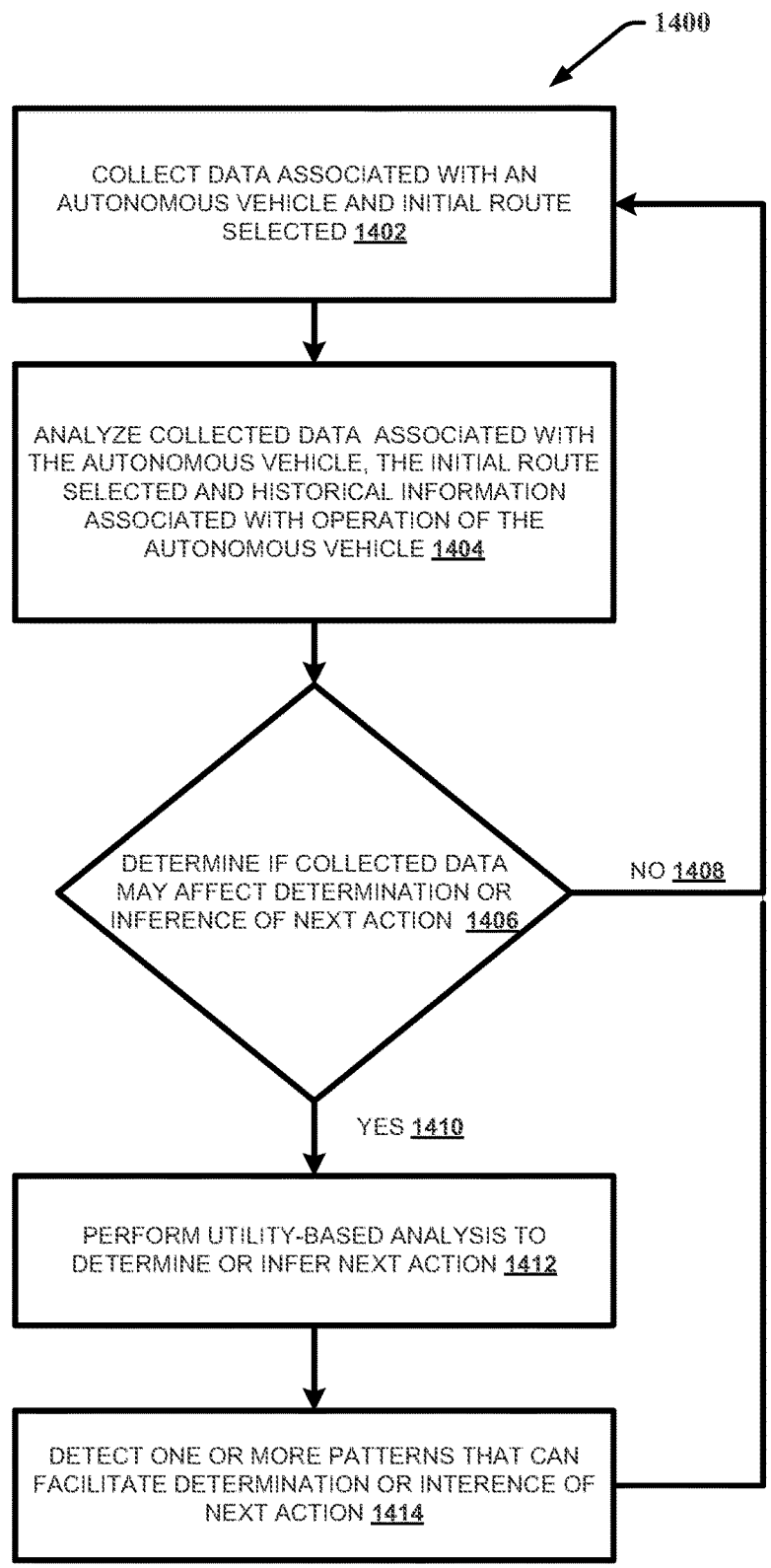
FIG. 14 illustrates a flow diagram of an example of a method to facilitate displaying next action of an autonomous vehicle in accordance with one or more embodiments described herein.

FIG. 14 illustrates another basic method flowchart 1400 of functional acts within various embodiments. Repetitive description of like elements employed in other embodiments described herein is omitted for sake of brevity. The method to facilitate displaying next action of an autonomous vehicle illustrated in FIG. 14 can be implemented in the system 1000 of FIG. 10. As such, reference is to be made to the example of FIG. 10 in the following discussion of the example of FIG. 14.

Thus, in the example of FIG. 14, a sequence to facilitate displaying next action of an autonomous vehicle 1400 is outlined. The sequence begins at box 1402 where data is collected associated with the autonomous vehicle and the initial route selected. For example, collected data can include data received from systems and devices within the autonomous vehicle as well as extrinsic information (e.g., weather, traffic data . . . ). At box 1404, the collected data associated with the autonomous vehicle, the initial route selected and historical information associated with operation of the autonomous vehicle is analyzed. At box decision 1406, it is determined if the collected data may affect determination of next action of the autonomous vehicle. If the collected data would not affect the determination or inference of next action (decision path 1408), no change in next action is determined or inferred without additional information collected 1402. If the collected data would potentially affect the determination or inference of next action (decision path 1410), at box 1412, a utility-based analysis is performed to determine or infer next action. At box 1414, one or more patterns can be detected that can facilitate determination or inference of next action.

The one or more embodiments of the present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Various aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

As it is employed in the subject specification, the term "processor" can refer to substantially any computing processing unit or device comprising, but not limited to, single-core processors; single-processors with software multithread execution capability; multi-core processors; multi-core processors with software multithread execution capability;

multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing one or more embodiments, but one of ordinary skill in the art can recognize that many further combinations and permutations of these embodiments are possible. The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments.

Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The terminology used herein was chosen to best explain the principles of the embodiments, the practical application or technical improvement over technologies found in the marketplace, or to enable others of ordinary skill in the art to understand the embodiments disclosed herein. In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

What is claimed is:

1. A system, comprising:
a memory that stores computer executable components;
a processor that executes computer executable components stored in the memory;
an analysis component that determines, using machine learning, based on real-time sensor data from sensors of an autonomous vehicle that is autonomously driving, a next action that will be performed by the autonomous vehicle; and
a display component that generates a graphical user interface that visually conveys in real-time the next action to an occupant of the vehicle prior to the autonomous vehicle performing the next action, wherein the graphical user interface comprises a geometric figure that dynamically morphs into a shape selected from a group of shapes to visually represent the next action, wherein the shape of the geometric figure concurrently indicates at least three characteristics of the next action selected from a group of characteristics comprising a direction of the autonomous vehicle during the next action, a speed of the autonomous vehicle during the next action, a degree of acceleration of the autonomous vehicle during the next action, a degree of deceleration of the autonomous vehicle during the next action, a degree of turn radius of the autonomous vehicle during the next action, and a condition of a surface of a road on which the autonomous vehicle is travelling during the next action, wherein first changes in width of the shape represent second changes in a first characteristic of the at least three characteristics, third changes in length of the shape represent fourth changes in a second characteristic of the at least three characteristics, and fifth changes in line type of the shape represent sixth changes in a third characteristic of the at least three characteristics.

2. The system of claim 1, wherein the shape concurrently indicates at least four characteristics of the group of characteristics, and seventh changes in color of the shape represent eighth changes in a fourth characteristic of the at least four characteristics.

3. The system of claim 1, wherein the shape concurrently indicates at least four characteristics of the group of characteristics, and seventh changes in a directional angle of the shape represent eighth changes in a fourth characteristic of the at least four characteristics.

4. The system of claim 1, further comprising an audio component that generates audio notifications of the next action.

5. The system of claim 1, further comprising an integration component that integrates the system with other visualization tools.

6. The system of claim 1, wherein the graphical user interface generated by the display component conveys a notification to a driver of the autonomous vehicle to take control of the autonomous vehicle.

7. The system of claim 1, wherein the analysis component further employs crowd-sourcing to facilitate the determining of the next action.

8. The system of claim 7, wherein the analysis component further employs extrinsic information to facilitate the determining of the next action.

9. The system of claim 1, wherein the graphical user interface comprises an augmented realty environment.

10. The system of claim 1, wherein the geometric figure comprises a three-dimensional image.

11. The system of claim 1, wherein the graphical user interface comprises one or more projected images.

12. The system of claim 1, further comprising a context component that monitors context of the autonomous vehicle or passengers of the autonomous vehicle.

13. A computer-implemented method comprising:
determining, by an autonomous vehicle operatively coupled to a processor, using machine learning, based on real-time sensor data from sensors of the autonomous vehicle that is autonomously driving, a next action that will be performed by the autonomous vehicle; and
generating, by the autonomous vehicle, a graphical user interface that visually conveys in real-time the next action to an occupant of the vehicle prior to the autonomous vehicle performing the next action, wherein the graphical user interface comprises a geometric figure that dynamically morphs into a shape selected from a group of shapes to visually represent the next action, wherein the shape of the geometric figure concurrently indicates three characteristics of the next action selected from a group of characteristics comprising a direction of the autonomous vehicle during the next action, a speed of the autonomous vehicle during the next action, a degree of acceleration of the autonomous vehicle during the next action, a degree of deceleration of the autonomous vehicle during the next action, a degree of turn radius of the autonomous vehicle during the next action, and a condition of a surface of a road on which the autonomous vehicle is travelling during the next action, wherein first changes in width of the shape represent second changes in a first characteristic of the at least three characteristics, third changes in length of the shape represent fourth changes in a second characteristic of the at least three characteristics, and fifth changes in line type of the shape represent sixth changes in a third characteristic of the at least three characteristics.

14. The method of claim 13, wherein the shape concurrently indicates at least four characteristics of the group of characteristics, and seventh changes in color of the shape represent eighth changes in a fourth characteristic of the at least four characteristics.

15. The method of claim 14, wherein the shape concurrently indicates at least four characteristics of the group of characteristics, and seventh changes in a directional angle of the shape represent eighth changes in a fourth characteristic of the at least four characteristics.

16. The method of claim 13, further comprising generating, by the autonomous vehicle, audio notifications of the next action.

17. The method of claim 13, further comprising notifying, by the autonomous vehicle, a driver of the autonomous vehicle to take control of the autonomous vehicle.

18. The method of claim 13, further comprising employing, by the autonomous vehicle, crowd-sourcing to facilitate the determining of the next action.

19. The method of claim 18, further comprising utilizing, by the autonomous vehicle, extrinsic information to facilitate the the determining of the next action.

20. The method of claim 13, wherein the graphical user interface comprises an augmented realty environment.

21. The method of claim 13, wherein the geometric figure comprises a three-dimensional image.

22. The method of claim 13, wherein the graphical user interface comprises one or more projected images.

23. The method of claim 13, further comprising monitoring, by the autonomous vehicle, context of the autonomous vehicle or passengers of the autonomous vehicle.

24. A computer program product comprising a computer readable storage medium having program instructions embodied therewith, the program instructions are executable by a processor of an autonomous vehicle to cause the processor to:
determine, by the processor, using machine learning, based on real-time sensor data from sensors of the autonomous vehicle that is autonomously driving, a next action that will be performed by the autonomous vehicle; and
generate, by the processor, a graphical user interface that visually conveys in real-time the next action to an occupant of the vehicle prior to the autonomous vehicle performing the next action, wherein the graphical user interface comprises a geometric figure that dynamically morphs into a shape selected from a group of shapes to visually represent the next action, wherein the shape of the geometric figure concurrently indicates at least three characteristics of the next action selected from a group of characteristics comprising a direction of the autonomous vehicle during the next action, a speed of the autonomous vehicle during the next action, a degree of acceleration of the autonomous vehicle during the next action, a degree of deceleration of the autonomous vehicle during the next action, a degree of turn radius of the autonomous vehicle during the next action, and a condition of a surface of a road on which the autonomous vehicle is travelling during the next action, wherein first changes in width of the shape represent second changes in a first characteristic of the at least three characteristics, third changes in length of the shape represent fourth changes in a second characteristic of the at least three characteristics, and fifth changes in line type of the shape represent sixth changes in a third characteristic of the at least three characteristics.

* * * * *